(12) United States Patent
Schneider

(10) Patent No.: US 8,998,687 B2
(45) Date of Patent: Apr. 7, 2015

(54) MULTI FUNCTIONAL SUPPLY PROFILE

(75) Inventor: Uwe Schneider, Jork (DE)

(73) Assignee: Airbus Operations GmbH, Hamburg (DE)

( * ) Notice: Subject to any disclaimer, the term of this patent is extended or adjusted under 35 U.S.C. 154(b) by 843 days.

(21) Appl. No.: 12/971,630

(22) Filed: Dec. 17, 2010

(65) Prior Publication Data

US 2011/0147520 A1 Jun. 23, 2011

Related U.S. Application Data

(60) Provisional application No. 61/287,828, filed on Dec. 18, 2009.

(30) Foreign Application Priority Data

Dec. 18, 2009 (DE) .......................... 10 2009 058 801

(51) Int. Cl.
| | |
|---|---|
| B64D 11/00 | (2006.01) |
| B64D 13/00 | (2006.01) |
| B64D 47/00 | (2006.01) |
| B64D 47/02 | (2006.01) |

(52) U.S. Cl.
CPC ................ *B64D 11/00* (2013.01); *B64D 13/00* (2013.01); *B64D 47/00* (2013.01); *B64D 47/02* (2013.01); *B64D 2011/0038* (2013.01); *B64D 2011/0053* (2013.01)

(58) Field of Classification Search
CPC ........ B64D 13/00; B64D 47/00; B64D 47/02; B64D 11/00; B64D 2011/0053; B64D 2011/0058

USPC .............................. 454/76, 83, 137; 244/118.5
See application file for complete search history.

(56) References Cited

U.S. PATENT DOCUMENTS

| | | | | |
|---|---|---|---|---|
| 2,424,828 | A | * | 7/1947 | Keep ............................... 454/99 |
| 3,871,729 | A | * | 3/1975 | Attema .......................... 439/116 |
| 5,556,332 | A | * | 9/1996 | Schumacher ................... 454/76 |
| 5,651,733 | A | | 7/1997 | Schumacher |
| 6,070,369 | A | * | 6/2000 | Roesler et al. .................... 52/45 |
| 8,444,425 | B2 | * | 5/2013 | Byrne ............................ 439/215 |
| 2006/0035502 | A1 | | 2/2006 | Tiesler et al. |
| 2009/0108649 | A1 | | 4/2009 | Kneller et al. |
| 2009/0135590 | A1 | * | 5/2009 | McCarthy et al. ............. 362/219 |
| 2009/0295223 | A1 | * | 12/2009 | Bauer et al. ................... 307/9.1 |
| 2010/0087130 | A1 | | 4/2010 | Nitsche et al. |

FOREIGN PATENT DOCUMENTS

| DE | 195 02 658 C1 | 1/1995 |
|---|---|---|
| DE | 10 2005 038 131 A1 | 3/2006 |

(Continued)

OTHER PUBLICATIONS

German Office Action for German Application No. 10 2009 058 801.9-22 mailed Nov. 4, 2010.

*Primary Examiner* — Gregory Huson
*Assistant Examiner* — Dana Tighe
(74) *Attorney, Agent, or Firm* — Ingrassia Fisher & Lorenz, P.C.

(57) ABSTRACT

A supply system is provided that includes, but is not limited to a profile element. The profile element includes, but is not limited to a front wall, a rear wall, and webs between the front wall and the rear wall so that there are ducts within the profile element. The supply system also includes, but is not limited to at least one functional component integrated in at least one of the plurality of ducts.

10 Claims, 3 Drawing Sheets

(56) References Cited

FOREIGN PATENT DOCUMENTS

| DE | 10 2007 014 406 B3 | 4/2008 |
| DE | 10 2008 028 258 A1 | 12/2009 |
| DE | 10 2008 058 271 A1 | 5/2010 |

* cited by examiner

MULTI FUNCTIONAL SUPPLY PROFILE

REFERENCE TO RELATED APPLICATIONS

This application claims the benefit of the filing date of and priority to German Patent Application No. 10 2009 058 801.9 filed Dec. 18, 2009 and of U.S. Provisional Patent Application No. 61/287,828 filed Dec. 18, 2009, which are hereby incorporated herein by reference in their entirety.

TECHNICAL FIELD

The technical field relates to the interior lining of a passenger compartment in a passenger transportation vehicle. In particular the technical field relates to a supply system for a passenger service unit in a passenger compartment of, for example, an aircraft.

BACKGROUND

From DE 19502658 C1 or from U.S. Pat. No. 5,651,733 A it is known that an arrangement to supply services to passengers in a passenger compartment, in particular in an aircraft, comprises a supply unit with comfort elements and operating elements such as a reading light, steward summoning button, loudspeaker, air nozzle, oxygen mask, oxygen generator, visual display elements and supply lines from a supply line to the supply unit. Such supply units are usually provided above the seat rows. For fastening panels including the supply units a two-rail system is commonly used, in which the panels are locked with retaining devices so as to be slidable in the direction of flight.

Arranging the functional panel of the passenger service duct in the direction of flight needs to take place individually for each aircraft layout in relation to the seat position so that each passenger may comfortably use each functionality from their seat. For this reason it is necessary to provide different dimensions in all panels for the purpose of length compensation. Since the so-called functional panels are to be placed precisely at a defined position above the seat rows, cabling and piping to the aircraft systems represents a considerable installation obstacle when fitting or retrofitting cabins. This is a major issue, all the more so since it is necessary at a very early point in time of definition to determine the aircraft construction documentation and the system provisioning locations (connection interfaces).

In view of the foregoing, it is at least one object to create a supply system that features a reduction in the number of components to be installed, and at the same time to provide increased flexibility relating to the aircraft layout. In addition, other objects, desirable features and characteristics will become apparent from the subsequent summary and detailed description, and the appended claims, taken in conjunction with the accompanying drawings and this background.

SUMMARY

Generally, a supply system according to an embodiment of the invention comprises a profile element and a functional component. The functional component is integrated in one of the ducts that form part of the profile element.

It may be one purpose of the embodiment to keep the aircraft structure free of any pre-installed cables and fluid systems (e.g., air conditioning lines, oxygen lines and passenger air supply lines), and consequently the fit-out times of aircraft fuselage sections prior to the actual cabin installation may be shortened. The multifunctional supply profile according to the embodiment of the invention may be to replace sandwich lining components, ceiling panels and hat racks in that profile elements are used which may be designed as continuously-cast components.

The profile element comprises a front wall, a rear wall and a multitude of webs between the front wall and the rear wall so that there are a multitude of ducts within the profile element. In this way, by means of the production as a continuously-cast component, it is also possible to implement differently-formed or differently-shaped ducts within the profile element. The ducts are arranged so as to be essentially parallel to each other and in longitudinal direction of the continuously-cast component. The end faces of the profile element may be manufactured as open ends. The ends of the individual ducts within the profile element may also be open at the end faces.

In accordance with the embodiments of the invention, continuously-cast components may individually be adapted to the situation in which they are to be affixed. In other words, on the one hand, the profile elements may be curved transversely to the longitudinal direction, for example in order to match a curvature of the outer wall of an aircraft. On the other hand, the profile elements may be curved in longitudinal direction, or they may also be of complex (e.g., three-dimensional) shape, e.g., in order to cover a transition to a round window recess.

In this manner it may thus be possible to design continuously-cast profiles both as lateral lining elements and as ceiling lining elements, or as elements that form a hat rack in a passenger compartment. It should be noted that on the basis of such a design it may also be possible to provide a film hinge between two ducts of a profile element, i.e., to provide a short section of significantly thinner wall thickness than is the case in the adjacent profile sections.

According to a further embodiment of the invention, a supply system further comprises a functional unit with at least one functional element. This functional unit may be connected to the profile element in such a manner that the functional element of the functional unit comes into contact with the corresponding functional component in the profile element, or may be connected to the profile element.

One possible functional element may be an air nozzle, which may, for example, be designed in such a manner that within the functional unit and underneath the air nozzle an aperture is provided which communicates with an aperture in the profile element as soon as the functional unit is connected to the profile element. In this manner one of the ducts in the profile element may be used as an air supply duct. The air may be fed in a targeted manner to the air nozzles by the functional units that are arranged above the passenger seat rows.

A further possible functional element may be a functional element that is controlled or driven by way of electrical current. For example, this may be a lamp or a reading light. On the other hand, electrically-operated elements may also include an information display, a steward summoning button, a loudspeaker or a display or monitor.

A further functionality that may be implemented by way of the supply system according to the embodiments of the invention relates to the transmission of data or signals by means of contactless transmission with the use of a transmitter foil and a corresponding receiver foil. The two foils may be provided within a duct of the profile element while the other of the two foils may be provided in the functional unit. By way of such lines it is possible to provide a computer connection on the functional unit, or to transmit music or image information to corresponding reproducing devices, for example to monitors or loudspeakers, on the functional unit.

The individual sections of the supply system according to the embodiments of the invention, which sections may be predetermined by the length of a profile element, may be interconnected by means of a junction sleeve. The junction sleeve is designed in such a manner that the at least one functional component of a profile element is connectable to the corresponding component of the following profile element or subsequent profile element.

It should be noted that, for example in an aircraft, an admission interface may be provided which makes it possible to connect the aircraft supply lines to the ducts within the profile elements.

According to a further embodiment of the invention, the supply system may be used in any passenger transportation means, for example in a bus, a train, a ship or an aircraft.

The above-described aspects and further aspects, features and advantages of the invention are also set out in the examples of the embodiments which are described below with reference to the appended drawings.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
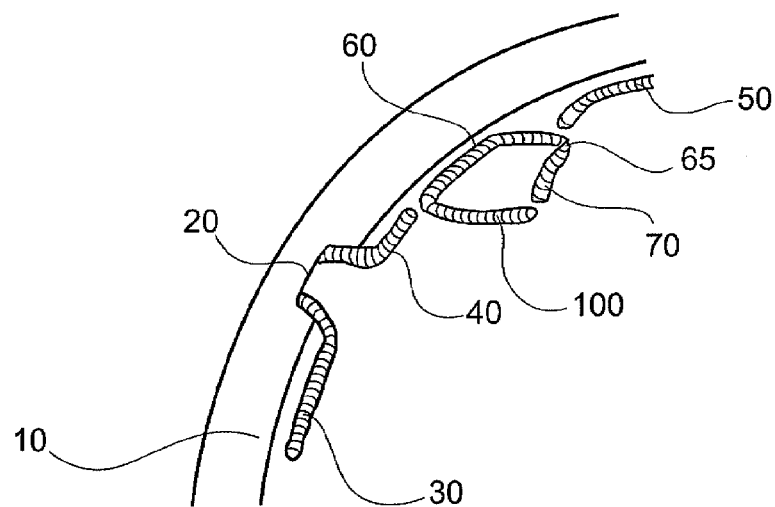
FIG. 1 shows a section view of a segment of a passenger compartment.

FIG. 1 shows a section view of a segment of an outer wall 10, such as a cabin wall of a passenger aircraft with a window 20, lateral lining parts 30 and 40 and a ceiling lining part 50. Also shown is a hat rack with a rear wall 60, with a hinge 65 and with a front 70, wherein the front 70 may be hinged open on the hinge 65. The underside of the hat rack is formed by the lining element 100.

In this case all the interior fitting components, i.e., lining components and hat rack forming components, are designed as continuously-cast profile elements. With the use of the profile elements as lining components it is possible to do without the use of supply lines or cabling between the lining elements and the outer wall 10. The continuously-cast profiles are provided in one manufacturing step with corresponding insertion components, coatings, perforations or openings within the hollow profile, which insertion components, coatings, perforations or openings on the one hand improve the longitudinal stiffness, and on the other hand bring about the subsequent functionalities. Thus, the lining components, which are designed as multifunctional supply profiles, may on the one hand reduce the manufacturing costs of the entire aircraft, and on the other hand as a result of multiple integration of functionalities in one component (e.g., visual functions, static functions and aircraft-system functions) may reduce the complexity and the overall weight of the aircraft.

The continuously-cast profiles are cut to the desired length in the direction of flight, which for a lateral lining would result in a typical component length of two frame element lengths, which for example is approximately 50 inches or approximately 127 cm. In relation to a hat rack or a ceiling lining the typical component length would be four frame element lengths, which for example is approximately 100 inches or approximately 254 cm. Thus, if the functional profile is to be implemented along the entire cabin length, it would be necessary to install many individual components (e.g., ceilings, sidewalls or hat racks) to each other in the direction of flight so that they establish electrical contact and are fluid-tight. To this effect functionally integrated junction sleeves, as a component sealing replacement, are inserted between the individual profile elements (e.g., stud plug-in system, for example similar to Lego bricks).

If an electrical connection in the direction of flight is to be established between the supply profiles, then a junction by way of a standardised rubber profile is ensured, which profile may be electrically insulated while at defined positions it may be designed as conductive rubber (principle of LCD zebra contacting), or as a fluid junction it may comprise openings. For essential cables, low-resistance junctions or for the routing of power, a lamp wire connector may reliably be integrated in the sealing profile. If a fluid-tight connection in the direction of flight is to be established between the supply profiles, then a junction by way of standardised openings in rubber profile is ensured, in the sense of a pneumatic pipe connection.

In those cases where a profile element ends in the direction of flight without a junction, e.g., at the end of the cabin or in door regions, the profile end is closed off by means of insertable end caps. The duct in the profile element thus ends at this position and may not be used for complete lead-through; however, because sufficient ducts are available, expert design of the cabin architecture may loop any systems to each layout through the entire cabin.

Figure 2:
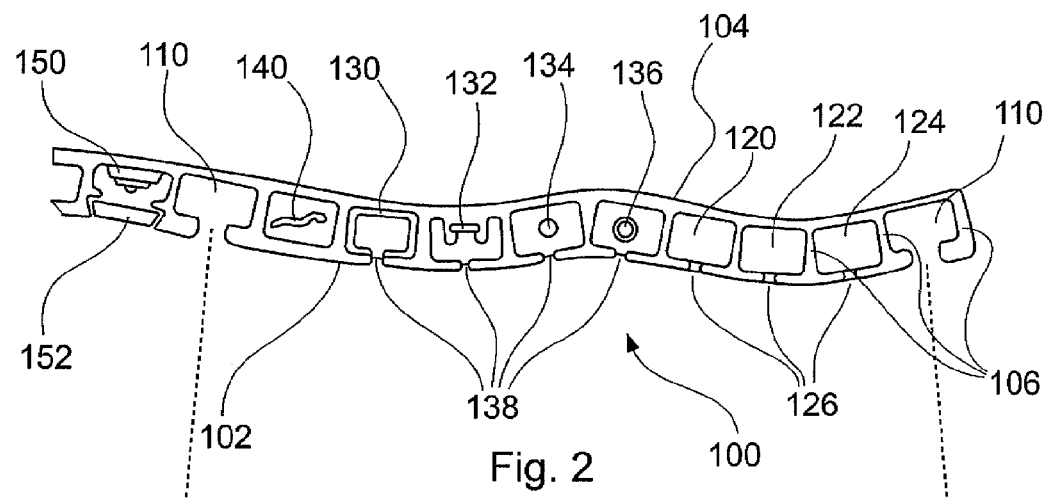
FIG. 2 shows a section view of a profile element including some ducts.

FIG. 2 shows a cross section of a profile element including a selection of functional components. The profile element 100 comprises a front wall 102, which is the bottom of the cross section in FIG. 2, a rear wall 104, which is the top in FIG. 2, and a multitude of webs 106 between the front wall 102 and the rear wall 104. The profile element 100 comprises two ducts 110 that comprise either perforated or slotted walls towards the front wall, and which are provided for receiving connection studs 210 of a functional unit.

The profile element 100 comprises air ducts 120, 122 and 124 as functional ducts. The respective air ducts comprise apertures 126. These apertures 126 are located at regular spacing along the air ducts. The apertures 126 may be designed as individual holes, a group of holes or as elongated holes.

As an example, the ducts 130, 132, 134 and 136 are shown and used for the transmission of electrical current or voltage. The duct 130 comprises a painted-on copper layer. The duct 132 comprises a conductive insertion component that is firmly connected to the rear wall 104, wherein a contact side of the conductive element is exposed. A bare cable has been inserted in the duct 134. An insulated cable has been inserted in the duct 136. The duct 136 furthermore shows a shield, which may, for example, be implemented by a painted-on layer of copper.

In the front wall the electrically-conducting ducts in each case comprise an area with a significantly thinner wall thickness, which may serve as a perforation point 138 for electrical contacts formed on a functional unit.

A foil, in particular a metal foil, is inserted in the duct 140 of the profile element, which foil may make contactless data transmission possible. Furthermore, in the duct 150 an LED strip is provided, and the front wall of the duct 150 may be designed to be open as far as possible so that a diffusing plate may be inserted into this open side of the duct 150 in order to, together with the LED strip, form a uniform elongated lighting system for illuminating the cabin of a passenger compartment.

Figure 3:
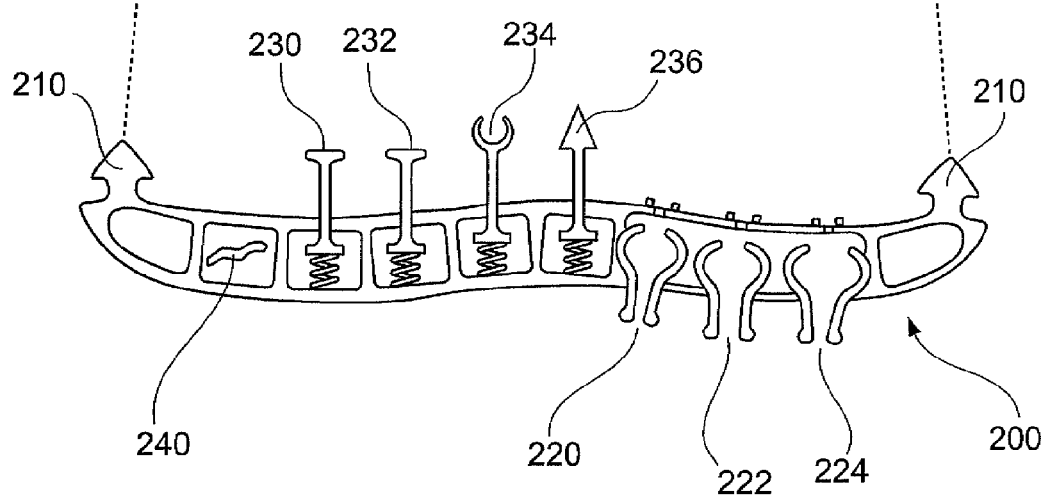
FIG. 3 shows a section view of a functional unit according to an embodiment of the invention.

FIG. 3 shows a cross section of a functional unit 200 which by means of the connection pins 210 may be made to engage the ducts 110 of the profile element. When the functional unit is connected to the profile element, the functional elements of the functional unit are automatically made to connect to the corresponding functional components in the profile element. For example, by way of corresponding apertures in the rear wall of the functional unit 200, the air nozzles 220, 222 and 224 may communicate with the apertures 126 of the profile element 100. Through the perforation points 138 in the profile element 100 the differently designed contact pins 230, 232, 234 and 236 may be made to contact the corresponding electrical conductors. Finally, a metal foil 240 for contactless communication with the metal foil 140 is shown.

It should be noted that in ducts of the profile element essentially identical electrical conductors may be provided, which may establish contact with essentially identical contacts on the functional unit. The illustration of different contacts 230, 234 and 236 as well as different conductors 130, 132, 134 and 136 merely shows that the individual design of the respective combinations may be possible in manifold ways.

Figure 4:
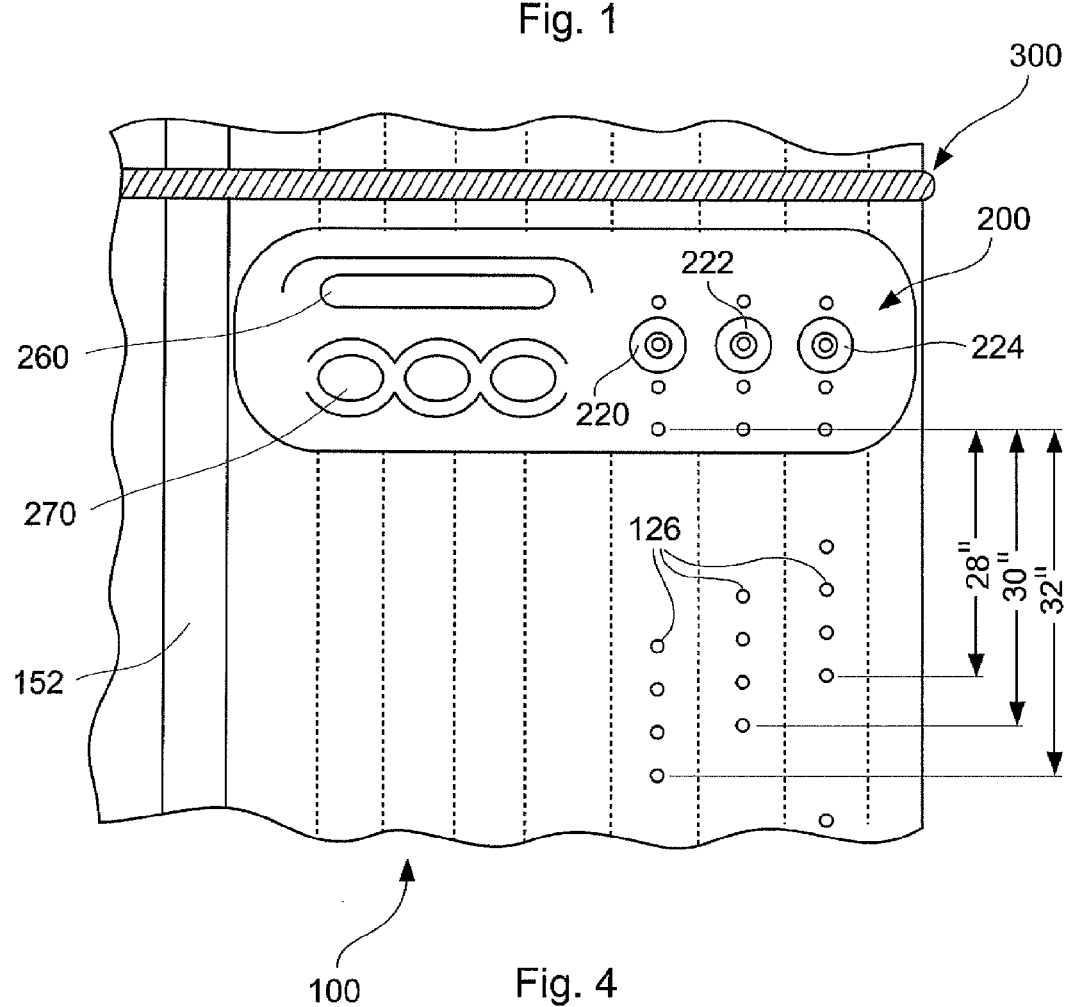
FIG. 4 shows a top view of a functional unit which is attached to a profile element.

By way of the contacts between the functional elements of the functional unit 200 and the functional components in the profile element 100 it is possible to implement functionalities as shown, for example in top view in FIG. 4. The air nozzles 220, 222 and 224 are shown, which normally are designed as swivellable nozzles. These nozzles are interconnected within the functional unit 200 so that it is sufficient for the space in the functional unit behind the air nozzles to merely be connected to an air duct in the profile element. This fact makes it possible to affix several functional units at irregular and/or regular spacing relative to each other. For example an air duct 120 of the profile element 100 may comprise apertures 126 at regular spacing of approximately 32 inches (approximately 81.3 cm). The adjacent air duct 122 comprises apertures 126 spaced apart by approximately 30 inches (approximately 76.2 cm), and the air duct 124 comprises apertures 126 spaced apart from each other by approximately 28 inches (approximately 71.1 cm).

In those cases where a seat pitch of approximately 28 inches is provided in the passenger compartment, at the same spacing in each case a functional unit may be positioned above each row of passengers by simple insertion into the profile element. In this way each functional unit would be located above one of the apertures 126 of the air duct 124. The apertures 126 of the adjacent air ducts 120 and 122 would partly be open at irregular spacing. However, any uncontrolled outflow from these open apertures may be prevented in that only the air duct 124 is pressurised with compressed air. At a seat pitch of 30 inches or 32 inches the functional units 200 would also be positioned above the seat rows, but at a distance so that the apertures 126 of the air duct 122, or 120 in the case of a seat pitch of approximately 32 inches, are regularly covered up by the functional unit.

By making it possible to have three different seat pitches by means of three air ducts it is possible, in a flexible and relatively simple manner, to vary the seat pitch, i.e., to vary the seating options in a passenger compartment, by simple sliding of the seat rows in the fastening rails and by correspondingly new snapping-in and thus positioning of the functional units above the passenger seat rows, i.e., to reconfigure the layout of the passenger compartment.

FIG. 4 also shows the lighting strip 152 that is designed so as to be independent of the functional units 200. Furthermore, seating illumination 270, as well as an information display 260, is diagrammatically shown.

Figure 5:
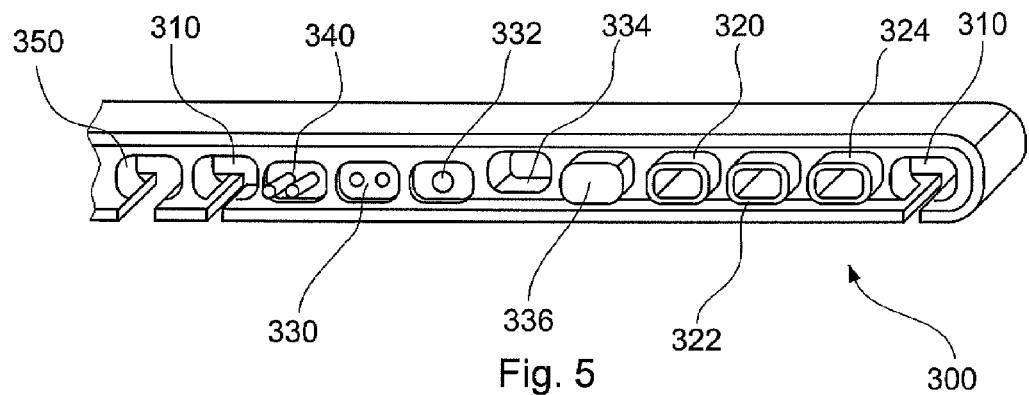
FIG. 5 shows an isometric view of a junction sleeve.

The junction sleeve 300 which in FIG. 4 is shown in top view is shown in FIG. 5 in an isometric view. As described above, the end faces of the continuously-cast profile elements may be open so that a junction sleeve 300 may be placed in a manner of a cap onto the end face and the open ends of the ducts formed in the profile element.

For example the air ducts 120, 122 and 124 may be interconnected by way of hollow studs 320, 322 and 324. The electrical functional components may, for example, be implemented by plugs 340, sockets 330, lamp wire connectors 332 either as inner wall contacts or as studs made of a graphite/rubber mixture. In order to continue an insulated cable, as shown, for example, in duct 136, a shield comprising a copper layer 334 may be provided in the junction sleeve. For through-routing of an LED strip by way of several profile elements a passage 350 may be provided. This passage may comprise an end that is open to the greatest extent possible in order to receive a diffusing plate strip that may also be provided to lead over several profile elements.

It should be noted that the junction sleeves may be made from a softer material than the continuously-cast profile elements so that a connection with a certain flexibility between two profile elements is achieved. The junction sleeve shown in FIG. 5 comprises a circumferential outside wall that protrudes in such a manner that it may encompass the front wall 102, the rear wall 104 and the outer webs 106 of the profile element so that a stable and tight connection of the ducts within the interconnected profile elements is achievable.

Figure 6:
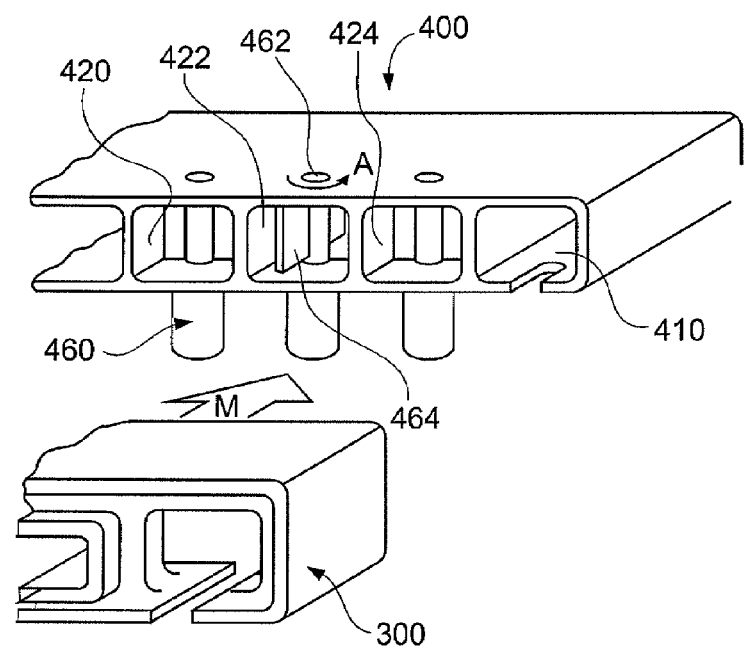
FIG. 6 shows a detailed view of an admission interface for connecting air ducts in a profile element.

FIG. 6 shows a further aspect of the supply system according to an embodiment of the invention. At the positions at which air or electrical current or data from the aircraft supply lines is to be introduced in the functional components of the profile elements, regulatable closure mechanisms for the air ducts may be provided so that depending on the layout of the passenger compartment the desired air duct may be opened or closed.

FIG. 6 also shows an outer end of a junction sleeve 300 on the one hand, and a section of an admission interface 400 on the other hand. Corresponding to the ducts in the profile elements or in the junction sleeves, the admission interface comprises a duct end 410 as well as air ducts 420, 422 and 424. In the end regions of the air ducts the illustration shows air regulation flaps 464 that are held so as to be rotatable on axes 462. For example by rotating the air regulation flaps 464 in the direction A on the axis 462, the corresponding air duct may be opened. FIG. 6 shows the air ducts 420 and 424 in their closed states, while the air duct 422 comprises an open air regulating flap 464. In order to control and drive the air regulating flaps, servomotors 460 may be provided which may be designed so as to be centrally controllable by way of corresponding signals.

In summary, the following aircraft system functions may be integrated in the multifunctional supply profile: fresh air, which may be individually set by the passenger, is blown into separate ducts by way of the multifunctional supply profile.

At defined positions these ducts comprise openings, for example spaced apart by approximately 28 inches, approximately 30 inches and approximately 32 inches. If a seat pitch of 28 inches is desired, the functional units are moved to the corresponding position, and air is blown only into the duct with the perforations at approximately 28 inch spacing. An analogous procedure applies in the case of a seat pitch of approximately 30 or approximately 32 inches.

The general cabin light is generated by way of a conductive foil comprising LEDs, in the duct, which duct may be designed as a reflector. Agreeable light diffusion may be implemented by a clip-in diffusing plate that may be a lens.

Electrical contacting takes place by way of collector pins which are led through the profile element through elastically deformable perforations. Transmission of electrical current within the profile element may take place by means of a painted-on copper layer, metallic insertion components, bare cables or insulated cables. The copper paint may also be used as shielding for essential cables.

Analogous to the transmission of electricity it is also possible to transmit a loudspeaker signal into the functional units. As an alternative, the profile element itself as a resonance body may be made to produce sound oscillations by means of an exciter. Analogous to the transmission of electricity it is also possible to transmit the steward summoning signal to activation keys of the functional unit. Analogous to the transmission of electricity it is also possible to transmit an information signal to possible displays of the functional unit.

The individual reading light is implemented in the functional unit in the form of a swivellable and adjustable lamp.

Data may be transmitted to the functional unit in a contactless manner by way of a transmitter. To this effect a metal foil may be used as an antenna and as a transmission element within the duct in the profile element. The individual functional units are controlled by way of different frequencies.

Separate oxygen boxes may be slidably fastened on the supply system at the contour that is designed as a receiving rail. The release current for the oxygen flaps may be routed through separate cables in the profile element. As an alternative, it is also possible to feed the oxygen directly by way of a central system through the profile elements. Electrical closure of the oxygen box flaps may be activated in an analogous manner to the transmission of electricity.

The so-called functional units or function satellites are clipped, plugged or slid into the multifunctional profile elements of the supply system directly above the passengers, and consequently passengers have all the desired functionalities available to them in an ergonomically optimum manner.

At the front end and at the rear end of the cabin all the functionalities from the multifunctional profile elements that are connected in the direction of flight, as well as the corresponding electrical and pneumatic generator terminals or pick-up terminals, may be interconnected, supplied and/or pressurised by way of so-called admission interfaces. The fresh air that may individually be set by passengers is also blown into the separate multifunctional profile element ducts by way of these admission interfaces.

While the invention was illustrated and described in detail in the drawings and in the above description, it is intended that such illustrations and descriptions are merely illustrative or exemplary rather than restrictive, and consequently the invention is not limited by the embodiments disclosed. Other variations of the disclosed embodiments may be understood and caused during implementation of the claimed invention, by an average person skilled in the art, from studying the drawings, the disclosure and the appended claims. In the claims the term "comprising" does not exclude other elements or steps, and the indefinite article "a" or "an" does not exclude a plural number.

The mere fact that particular characteristics or features are mentioned in various dependent claims does not limit the scope of the invention. It is also possible to advantageously use any combinations of these characteristics or features. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A supply system, comprising:
   a profile element, the profile element comprising:
   a front wall;
   a rear wall; and
   a plurality of webs between the front wall and the rear wall so that there are a plurality of ducts within the profile element, wherein the profile element is a continuously-cast component, and the plurality of ducts are arranged in a longitudinal direction of the continuously-cast component;
   a functional component; and
   a functional unit with a functional element and connection studs,
   wherein the plurality of ducts within the profile element includes first ducts for receiving the connection studs of the functional unit and second ducts in which the functional component is integrated;
   wherein the functional element is an electrical functional element with a conductive pin and the functional component is an electrical conductor;
   wherein the functional unit is connectable to the profile element in such a manner that the connection studs of the functional unit are received in the first ducts of the profile element and the functional element is automatically connected to the functional component by way of a connection of the conductive pin with the electrical conductor; and wherein the functional unit comprises a second functional element, and the second functional element is an air nozzle, and the profile element comprises a second functional component, and the second functional component is an air duct with an aperture in communication with the air nozzle.

2. The supply system of claim 1, wherein the profile element is a lining panel for a passenger compartment.

3. The supply system of claim 1, wherein the functional unit comprises a third functional element, and the third functional element is an element for contactless data transmission, and the profile element comprises a third functional component, and the third functional component is designed to provide the contactless data transmission between the third functional element and the third functional component.

4. The supply system of claim 1, wherein the profile element comprises an illumination component.

5. The supply system of claim 1, further comprising a junction sleeve adapted to provide an interconnection of a first end face of a first profile element facing a second end of a second profile element, wherein the junction sleeve is designed such that the functional component of the first profile element is adapted to connect to a corresponding functional component of the second profile element.

6. A passenger transportation, comprising:
a supply system comprising:
a profile element, the profile element comprising:
a front wall;
a rear wall; and
a plurality of webs between the front wall and the rear wall so that there are a plurality of ducts within the profile element, wherein the profile element is a continuously-cast component, and the plurality of ducts are arranged in a longitudinal direction of the continuously-cast component;
a functional component; and
a functional unit with a functional element and connection studs,
wherein the plurality of ducts within the profile element includes first ducts for receiving the connection studs of the functional unit and second ducts in which the functional component is integrated;
wherein the functional element is an electrical functional element with a conductive pin and the functional component is an electrical conductor;
wherein the functional unit is connectable to the profile element in such a manner that the connection studs of the functional unit are received in the first ducts of the profile element and the functional element is automatically connected to the functional component by way of a connection of the conductive pin with the electrical conductor; and wherein the functional unit comprises a second functional element, and the second functional element is an air nozzle, and the profile element comprises a second functional component, and the second functional component is an air duct with an aperture in communication with the air nozzle.

7. The passenger transportation of claim 6, wherein the profile element is a lining panel for a passenger compartment.

8. The passenger transportation of claim 6, wherein the functional unit comprises a third functional element and the third functional element is an element for contactless data transmission, and the profile element comprises a third functional component and the third functional component is designed to provide the contactless data transmission between the third functional element and the third functional component.

9. The passenger transportation of claim 6, wherein the profile element comprises an illumination component.

10. The passenger transportation of claim 6, further comprising a junction sleeve adapted to provide an interconnection of a first end face of a first profile element facing a second end of a second profile element, wherein the junction sleeve is designed such that the functional component of the first profile element is adapted to connect to a corresponding functional component of the second profile element.

* * * * *